United States Patent

[11] 3,583,210

[72] Inventor Myron C. Orr
c/o Snappy Manufacturing Co., P. O. Box 881, Missoula, Mont. 59801
[21] Appl. No. 797,430
[22] Filed Feb. 7, 1969
[45] Patented June 8, 1971

[54] COOLING SYSTEM TESTER
13 Claims, 5 Drawing Figs.
[52] U.S. Cl. ................................................. 73/49.2
[51] Int. Cl. ..................................................... G01m 3/32
[50] Field of Search ............................................ 73/40, 49.2, 49.3, 40.5, 45.8, 118

[56] References Cited
UNITED STATES PATENTS
3,138,949  6/1964  Pipes ............................ 73/40
3,213,672  10/1965  Orr ............................... 73/40X Primary Examiner—S. Clement Swisher
Assistant Examiner—William A. Henry II
Attorney—Wells and St. John ABSTRACT: A testing apparatus for engine colling systems including radiators and radiator caps. The test apparatus is contained in an enclosure separate from the radiator and connected to a source of compressed air. An inflatable plug is used to both seal the radiator inlet and supply air to the interior of the radiator. A cap mount is provided on the enclosure for testing the radiator cap independently of the radiator and for alternately including the normally openable cap elements in the cooling system being tested. During testing of the radiator, the cap provides the identical safety functions which it normally provides when seated on the radiator inlet.

In operation, the cap is placed on the cap mount and the inflatable plug is pressurized to seal the radiator inlet. Air under pressure can then be directed in succession to the cap mount and to the radiator interior, thereby permitting the user to determined the presence and location of pressure leaks in the cooling system.

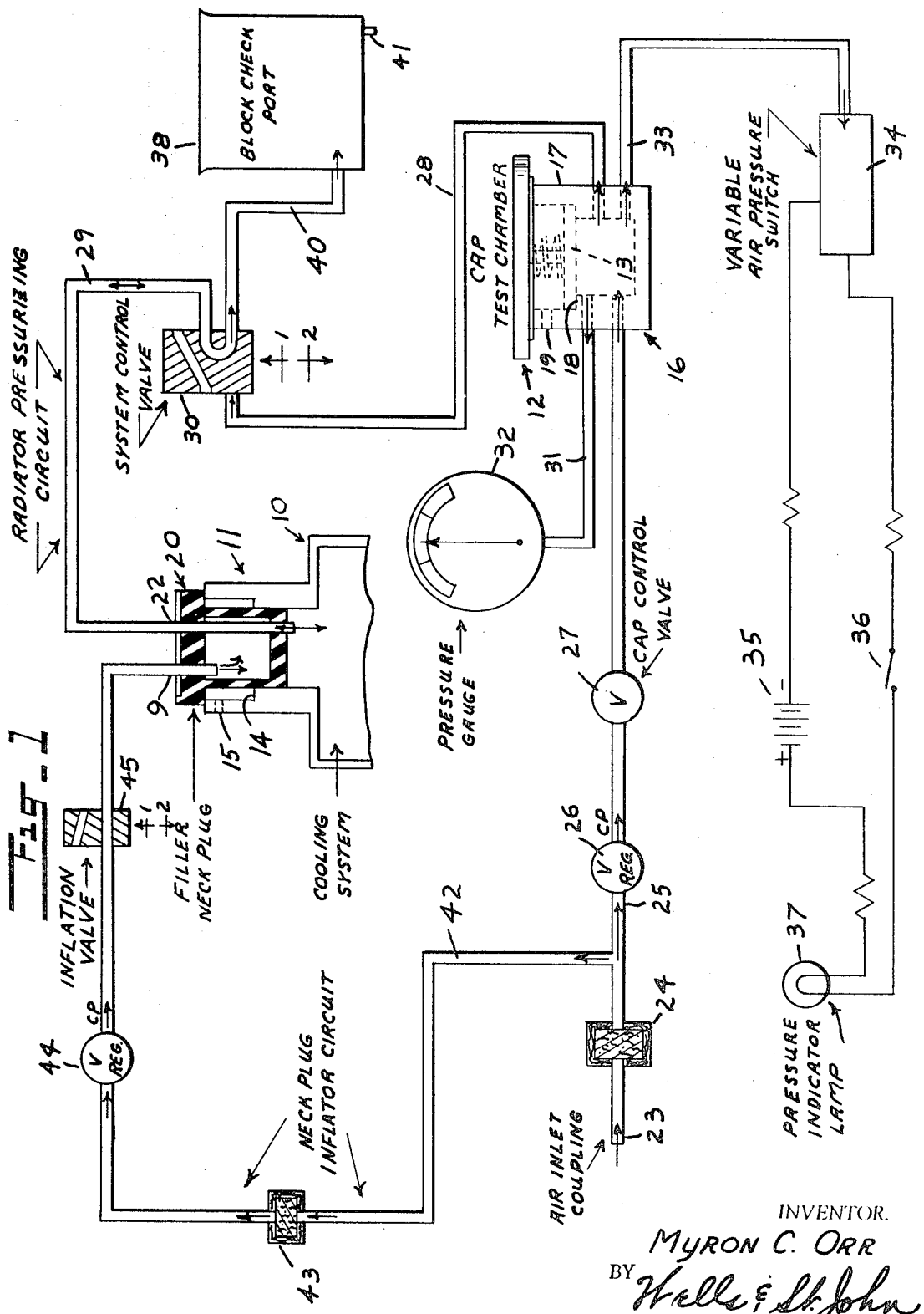

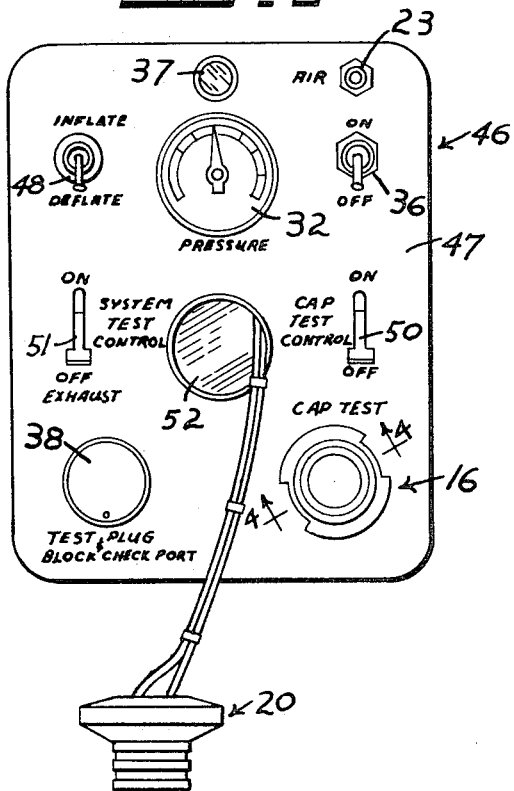
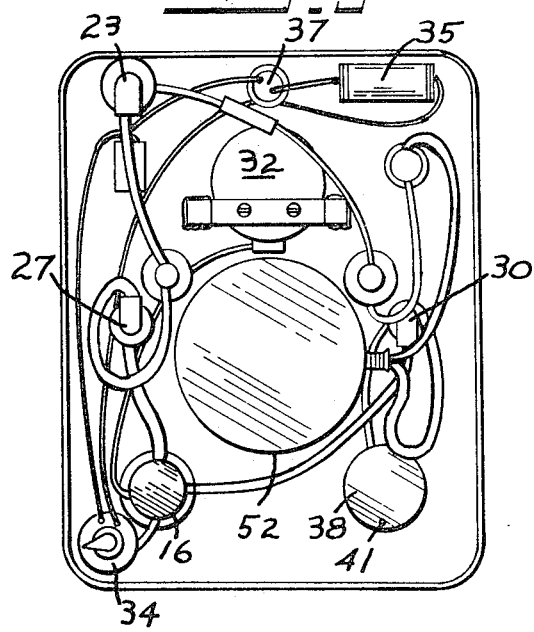
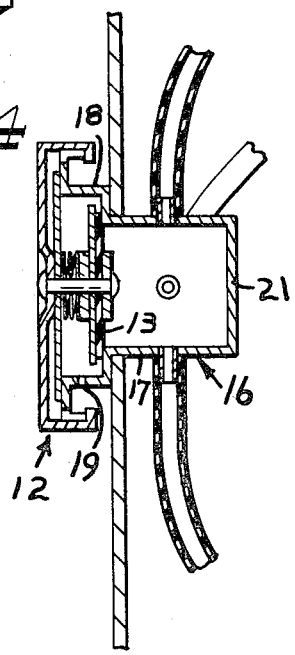
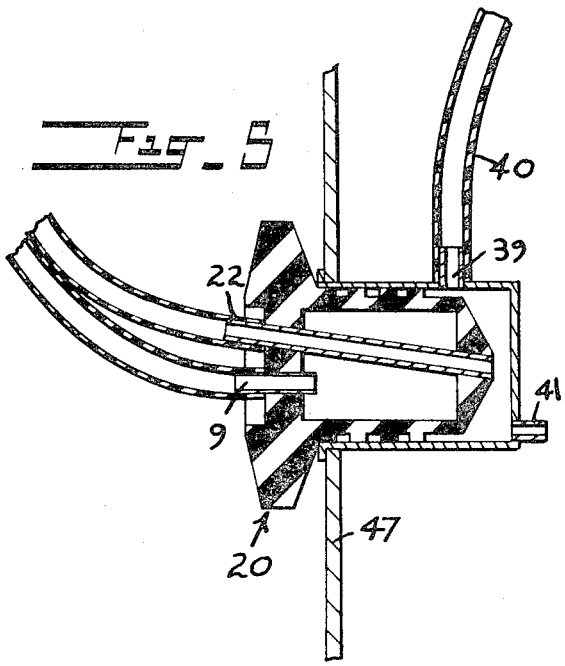

COOLING SYSTEM TESTER

BACKGROUND OF THE INVENTION

In my prior U.S. Pat. No. 3,213,672, granted Oct. 26, 1965, I disclosed the general features of a resilient inflatable plug for the inlet opening of a radiator in order that the radiator can be sealed off effectively for pressure testing purposes. By sealing a radiator and applying pressure to the interior thereof, one can effectively determine the presence and location of leaks that render the radiator ineffective in use.

In further developing the commercial utilization of such a plug, it has been necessary to introduce equipment of a portable nature that can be readily used to test a radiator and cap while mounted on a vehicle or otherwise located on equipment of which the radiator formed a part. The present apparatus provides a practical testing device for radiators and caps which can be effectively used in a service station, garage or other maintenance center. It is readily adaptable to portable use along with a self-contained source of pressurized air, so as to be usable for field testing of stationary radiators at power generating plants, compressors etc.

Prior devices for testing the cooling systems of automobiles have been rather bulky in structure and have not provided great versatility with respect to the sizes of inlets that can be checked by them. Examples of prior devices using hand pumps for pressure testing are shown in the patents to Mansfield, U.S. Pat. No. 3,100,391 and Pipes, U.S. Pat. No. 3,138,949. Manual pumping involves considerable additional labor and time spent in making the test procedure. An apparatus using a source of compressed air for testing radiators and caps is shown in the Black U. S. Pat. No. 3,014,361, but it provides no definite mechanism for separately testing the cap apart from the radiator. Similarly, the Kayser U.S. Pat. No. 2,893,238, which only tests the radiator, utilizes a liquid reservoir that must be separately handled and controlled, and requires use of a sight glass that must be maintained vertically in condition visual observation. A study of these patents indicates that the use of any of the devices disclosed would be quite cumbersome and not acceptable in a normal service station or garage procedure.

SUMMARY OF THE INVENTION

The invention set out in this disclosure comprises an apparatus for testing a vehicle cooling system that includes a cap testing device that mounts the radiator cap identically to its intended mounting on the radiator inlet. The cap testing structure includes an enclosed chamber in open communication with and selectively sealed by the radiator cap. The filler neck plug mounted in place of the cap during testing of the radiator has expandable sidewalls to selectively seal the inlet of the radiator from which the cap has been removed. It also includes a passage formed through the plug in communication with the interior of the radiator. Conduit connections are provided for pressurizing the chamber of the cap test structure and for connecting the chamber to the passage of the filler neck plug in series with a source of pressurized air. Valve means is provided to selectively exhaust the passage of the filler neck plug so as to relieve the test pressure within the radiator while controlling any possible flow of coolant to the apparatus.

In addition to this essential structure, the apparatus includes a block check device provided in conjunction with the structure so as to permit one to check for leakage of combustion gases from the engine block into the cooling system. The apparatus also includes selectively operable air connections for inflating the filler neck plug. Visual controls are provided for monitoring the pressure in the system and for checking the ability of the cooling system and/or cap to withstand a desired pressure level.

It is a first object of the invention to provide a practical portable apparatus for testing the cooling system of engines using liquid radiators and pressure relief caps.

It is another object of the invention to provide a quick test of a radiator cap apart from the cooling system, as well as a test of the cooling system including the cap structure.

Another object of the invention is to provide a testing apparatus that can be readily used by one having no particular technical skills so as to require little training or understanding of the testing apparatus itself in order to insure successful testing procedures.

Another object of the invention is to provide suitable protection for the apparatus to prevent damage to it from liquid being drawn back from the radiator or from accidental inflation of the filler neck plug when not in actual use.

These and further objects will be evident from the following disclosure and the details of the accompanying drawings which illustrate a preferred form of the apparatus.

BRIEF DESCRIPTION OF THE DRAWINGS

FIG. 1 is a schematic view of the test apparatus;

FIG. 2 is a front view of the test assembly;

FIG. 3 is a rear view of the test assembly with a protective rear cover removed;

FIG. 4 is a enlarged sectional view through the cap mounting structure as shown along line 4–4 in FIG. 2, a cap being illustrated in place; and FIG. 5 is a sectional view through a filler neck plug while located in the block check port during storage.

DESCRIPTION OF THE PREFERRED EMBODIMENTS

The general features of the test apparatus are shown in FIG. 1, which schematically illustrates the various elements used in carrying out an effective and quick testing procedure to determine the existence of leaks in an engine cooling system or the failure of a radiator cap to maintain proper pressure in the system. FIGS. 2 and 3 show the general arrangement of the various elements in a particular enclosure developed for practical use. FIG. 4 shows the details of the cap test mount apparatus on the enclosure. FIG. 5 shows the details of a typical test plug as might be used with the structure in FIGS. 2 and 3.

The present apparatus is concerned with the testing of the interior of a cooling system such as is used on motor drive vehicles or in stationary engine installations where the engine is water cooled. In such an installation the cooling system normally includes a radiator indicated generally at 10 and having a filler neck indicated generally at 11. The filler neck 11 normally includes an overflow opening adjacent to the cap that permits relief of excess pressure within the radiator 10 by movement of a yieldable pad on the underside of the cap. In the present disclosure the cap is shown at 12. The yieldable pad is shown at 13. Cap 12 is normally used to seal inlet 11 as pad 13 is biased against a conventional seat 14. The inlet 11 also includes a relief opening at 15 which is located outward of seat 14.

In the present apparatus a cap test chamber 16 is formed as a sealed enclosure having a mounting neck 17 identical in structure to the inlet 11, including a conventional seat 18 and relief opening 19. The cap 12 is mounted on the mount 17 in precisely the same manner as it is normally mounted on a radiator. In fact, as shown in FIG. 4, the cap test chamber 16 can be fabricated by utilizing the filler neck portion of a radiator and closing its inner end by a wall 21. The only further modification necessary is the provision of suitable air inlet and outlet connections in communication with the interior of chamber 16.

After removal of the radiator cap 12, the filler neck 11 is selectively sealed by an inflatable plug 20. The plug 20 is a hollow rubber plug having suitable length and diameter so as to fill the interior of the filler neck when air under pressure is directed to its interior. The air connection for inflation of plug 20 for directing air under pressure to or from the interior of radiator 10, this passage being generally indicated at 22. The physical details of a typical plug are shown in FIG. 5 and the general requirements of such a plug are discussed more fully in my prior U.S. Pat. No. 3,213,672.

The general purpose of the apparatus disclosed more specifically below is to direct air under pressure to the cap testing chamber 16 to check the ability of the radiator cap 12 to maintain normal operating pressure within the cooling system. A second test procedure involves the application of air under pressure to the interior of the cooling system through radiator 10 in series with the cap test chamber so as to simultaneously check the ability of the cooling system and cap to maintain operating pressure. In a third optional test, air exhausted from the cooling system is checked to determine the presence of combustion gases due to cracks or defects in the engine block.

The apparatus includes an air inlet coupling 23 which can be connected to any suitable source of air under pressure, such as a compressor or tank of pressurized air. A main filter 24 is included in the inlet connection.

The first test of cap 12 itself requires a supply of air under pressure in the cap test chamber 16. The first branch conduit shown generally at 25 leads from air inlet coupling 23 to the interior of the cap test chamber 16. It includes a constant pressure regulator 26 preset at a value above the normal operating pressure for the cooling system. For automobiles using cap pressures from 4 p.s.i. to 18 p.s.i., the regulator 26 should be set at about 22 p.s.i. It also includes an "on-off" cap control valve 27 which regulates the flow of air from the air inlet coupling 23 to the interior of the cap test chamber 16. By moving the valve 27 to an "on" position, air passage is provided to the interior of cap test chamber 16. When in its "off" position, valve 27 blocks passage of air to or from the cap test chamber 16.

The cap test chamber 16 is also in open communications with a first portion 28 of a second conduit that is directed by means of a second portion 29 to the passage 22 that leads to the interior of the cooling system. A system control valve 30 is interposed between the two portions 28, 29 of this second conduit, having two alternative operating positions. In position 1, as illustrated, valve 30 blocks the passage of air between the two portions 28, 29 and passage 22 is exhausted. In position 2, the portions 28, 29 are connected to one another in open communication.

A third connection to the interior of the cap test chamber 16 is provided by conduit 31, which leads to a conventional pressure gauge 32. The gauge 32 provides a visual indication of the amount of pressure within the interior of the chamber 16. When desired, a fourth conduit 33 leads to an air pressure actuated switch assembly 34 of conventional manufacture. Switch 34 is preferably manually adjustable so that it can be set to operate at the operating pressure required in the cooling system being tested. The switch assembly 34 is the operative control for an electrical circuit including a battery 35 and test switch 36 in series with an indicator lamp 37. The lamp 37 is lighted by switch assembly 34 when pressure in cap test chamber 16 is below a preset level. It provides an immediate visual indication that the pressure in the system being tested is below its rated pressure.

The two portions 28, 29 of the second conduit described above and the system control valve 30 constitute the essential elements of the radiator pressurizing circuit. When valve 30 is in position 2, air under pressure can be directed through cap test chamber 16 to the interior of the cooling system. When valve 30 is in position 1, the portion 29 of the second conduit is exhausted to a block check port 38, shown in detail in FIG. 5. The block check port 38 essentially comprises a cylindrical enclosure open at one end and having an interior diameter corresponding to the exterior diameter of the filler neck plug 20. The block check port 3 includes a passage 39 to which an air conduit 40 is secured for directing air from the portion 29 of the second conduit to the interior of the block check port 38. A restricted outlet 41 is provided at the lower end of the block check port 38 to permit relief of air under pressure or liquid within the enclosure. The restriction of the opening at 41 permits relief of air under pressure, but slows down the release of such air for purposes that will be described below.

The filler neck plug 20 is selectively inflated by air directed through a second branch 42 of the air supply. The branch 42 also includes a second filter 43 and a constant pressure regulator valve 44 preset to the operating pressure desired for plug inflation. An inflation valve 45 is included in the conduit connections, having two normal positions which are manually controlled. In position 1, the interior of the plug 20 is exhausted to atmosphere. In position 2, as shown, the interior of plug 20 is connected in series to the source of air for inflation purposes.

All of the various elements shown in FIG. 1 can be mounted within a common enclosure shown at 46 in FIGS. 2 and 3. A control panel 47 of enclosure 46 mounts the various control elements and devices for handling the radiator cap and plug. These include the handle 48 that positions inflation valve 45 in either of its positions 1 or 2. Also included is a handle 50 that positions the cap control valve in either an "on" or "off" condition. A handle 51 is provided for positioning of the system control valve 30 in position 1 where it is operatively "off" and position 2 where it is operatively "on." The opening of the block check port 38 is essentially flush with the panel 47 as shown in FIG. 5. The flange of cap test chamber 16 projects slightly beyond panel 47 in the manner illustrated in FIG. 4. A storage enclosure 52 mounted within the enclosure 46 serves to hold the flexible tubing that extends to the plug 20. It also is open through panel 47 and might include a suitable reel apparatus if desired.

OPERATION OF THE APPARATUS

The described apparatus is portable and is light enough to be placed on a car fender or any convenient support. To prepare the apparatus for testing of a cooling system, such as is found commonly on vehicles having internal combustion engines, the enclosure 46 is brought to a location adjacent to the vehicle. The air inlet coupling 23 is connected to a compressor hose or to a hose leading to bottled air under adequate pressure. Switch 36 is moved to its "on" position. The system control valve is initially in position 2, indicated on the control panel by the designation "off." The cap control valve 27 is also in its "off" condition.

The radiator cap 12 is then removed from the radiator and placed on the cap test chamber 16 in the manner shown in FIG. 4. A suitable size of plug 20 is then connected to the flexible lengths of conduit leading from the storage enclosure 52, and is placed within the cooling system radiator inlet 11 in the manner shown schematically in FIG. 1. Switch 34 is manually set to the operating pressure at which the cooling system is rated. The apparatus is then ready for operation to first test cap 12 and then the entire cooling system 10 including the cap 12 removed from the radiator.

To test the operation of the cap, valve 27 is moved to its "on" condition, thereby pressurizing cap test chamber 16. If cap 12 is operating correctly it will maintain the pressure at switch 34 at the value at which switch 34 is manually set. This pressure will result in lamp 37 being extinguished. The actual amount of pressure is monitored by viewing pressure gauge 32. After pressurizing of chamber 16, the valve 27 is moved to its "off" condition. If the needle of gauge 32 is then moved downwardly, this is a ready indication of cap deficiency. As a second check, the indicator lamp 37 will be lighted if the pressure within the chamber 16 drops below the preset value at which switch 34 completes the lamp circuit. If the cap is satisfactory the gauge 32 will maintain a steady reading and the lamp 37 will not be lighted.

Assuming that the cap test is satisfactory, the cap remains on the test chamber 16 and the plug 20 is inflated by moving the inflation valve 45 to position 2, designated on the panel of enclosure 46 by the word "inflate." The radiator 10 is thereby sealed. The system control valve 30 is then moved to position 2, designated on the operating panel of the enclosure 46 by the word "on." The system is pressurized by operating the cap control valve 27 again, moving it to the "on" position. When the indicated cap pressure is reached on the pressure gauge 32, the valve 27 can be left at its "on" condition without danger of pressurizing the cooling system beyond its designed limits, since the cap 12 automatically acts as a safety valve to permit relief of excess pressure by movement of the pad 13 in the normal fashion. To check the cooling system for leakage, the cap control valve 27 is returned to its "off" condition and the pressure gauge 32 is again observed to determine whether there is a drop in pressure. Again, a drop below a preset pressure will result in the indicator light 37 flashing on. If the pressure in the system remains steady for two minutes or more, the cooling system is free of appreciable leaks.

The block check port 38 can be used with commercially available testing devices to determine the presence of exhaust gases within the cooling system. Such devices (not shown) are conventionally provided with rubber bulbs that fit within the inlet 11 of the radiator. In place of such use the bulb can be placed in the opening of the block check port 38. When the system control valve is moved to position 2 indicated by the designation "off," the pressurized air from within radiator 10 will exhaust into the block check port 38. This air can then be used for testing through such a chemical unit to determine whether combustion gases are present within the radiator and cooling system.

After these testing procedures, the slight amount of pressurized air in cap test chamber 16 can be exhausted by a quick opening and closing of valve 30, or by simply removing the cap 12. Plug 20 is deflated by returning valve 45 to its original condition which results in the exhausting of the plug interior. The plug 20 is removed and normally stored in the block check port 38 as shown in FIG. 5. If one should accidentally move valve 45 to the "inflate" position, plug 20 will simply expand against the walls of port 38 and will not be damaged or possibly endanger persons around the vicinity. The indicator lamp 38 is then extinguished by opening of switch 36.

The above procedures can be carried out efficiently and very quickly by one having a minimum amount of mechanical skill. No particular adjustment of the apparatus is necessary and it is impossible to provide excess pressure within the system, since the cap 12 itself acts as a safety valve. The unit serves the function of separately testing the radiator cap 12 and cooling systems, and the cooling system as tested always includes the radiator cap that is used to normally seal it. If one wishes only to check the operation of the cap this also can be accomplished by simply eliminating the use of the plug 20 in that particular instance. The apparatus provides great versatility in this testing procedure and is applicable to a wide variety of conditions.

Obviously modification can be made in the physical arrangement shown in FIGS. 2 and 3 and in the choice of particular valves and elements for carrying out the function discussed above. As an example, the pressure indicator lamp 37 and all equipment associated with it can be eliminated if one choses to rely solely upon the visual gauge 32. Audible buzzers or other signals can be used in place of the lamps shown.

Having thus described my invention, I claim:

1. In an apparatus for testing a vehicle cooling system that includes a radiator having a filler neck normally sealed by a removable radiator cap, the improvement comprising:
   cap test means for mounting a radiator cap in a manner identical to the intended mounting of the cap on a radiator filler neck, said cap test means comprising a chamber in open communication with and selectively sealed by a radiator cap mounted thereon;
   plug means having expandable sidewalls for selectively sealing the filler neck of a radiator, said plug means including a passage formed therethrough in open communication with the interior of a radiator sealed thereby;
   first conduit means adapted to be operatively connected between a source of pressurized gas and the chamber of said cap test means for selectively delivering gas from the source to said chamber;
   and second conduit means operatively connected between said chamber and the passage of said plug for selectively delivering gas from the chamber to a radiator interior, said second conduit means including first valve means having an exhaust port for selectively exhausting said interior of the radiator.

2. The apparatus as set out in claim 1 further comprising:
   block check means in the form of a receptacle having an opening at one end complementary to a device for determining the presence of leakage combustion gases within a cooling system;
   and a third conduit means operatively connected between the exhaust port of said first valve means and the interior of the receptacle of said block check means.

3. The apparatus as set out in claim 2 wherein the opening at said one end of the receptacle is also complementary to the sidewalls of said plug means so as to serve as safe storage for the walls of the plug means between uses of the apparatus.

4. The apparatus as set out in claim 2 wherein the receptacle is provided with a restricted liquid relief opening at the lower end thereof.

5. The apparatus as set out in claim 1 further comprising:
   gas pressure indicating means operatively connected to the chamber of said cap test means.

6. The apparatus as set out in claim 1 wherein the plug means is inflatable to expand the sidewalls thereof and further comprising:
   third conduit means operatively connected between the source of pressurized gas and the interior of said plug means for selectively directing gas under pressure to the interior thereof.

7. The apparatus as set out in claim 6 wherein the third conduit means includes a control valve having an outlet connection operatively connected to the interior of said plug means and selectively exhausted to atmosphere.

8. In an apparatus for testing a vehicle cooling system that includes a radiator having a filler neck normally sealed by a removable radiator cap, the improvement comprising:
   an enclosure having a control panel formed thereon;
   a cap testing chamber mounted within the enclosure and including a cap mounting flange protruding outwardly through the control panel for selective closure by a radiator cap in a manner identical to the intended mounting of the cap on a radiator filler neck;
   a filler neck plug having expandable sidewalls adapted to selectively seal the filler neck of a radiator and including a passage formed therethrough in open communication with the interior of a radiator sealed thereby;
   a first conduit within the enclosure selectively connected to a source of pressurized air, said first conduit being in communication with the interior of said cap testing chamber;
   a second conduit within the enclosure also in communication with the interior of said cap testing chamber, said second conduit including a flexible section leading outward of the enclosure through the control panel and connected with the passage formed through the filler neck plug, said second conduit including a first valve within the enclosure for selectively connecting the passage and chamber, or exhausting the passage.

9. An apparatus as set out in claim 8 wherein the first valve is operated by a manual control handle on the control panel of the enclosure.

10. An apparatus as set out in claim 8 further comprising:
    a pressure indicating device mounted on the control panel of the enclosure and operatively connected to the interior of said cap testing chamber.

11. An apparatus as set out in claim 8 wherein the filler neck plug is inflatable through a valve connection to expand the sidewalls thereof; said apparatus further comprising:
    a third conduit within the enclosure selectively connected to the source of pressurized air in common with said first conduit, said third conduit including a flexible conduit leading outward of the enclosure selectively connected with the valve connection of the filler neck plug.

12. An apparatus as set out in claim 11 further comprising:
a receptacle recessed within the enclosure having an opening at one end on the control panel of the enclosure complementary to the sidewall configuration of the filler neck plug.

13. An apparatus as set out in claim 12 wherein the exhaust connection of said first valve leads to the interior of said receptacle.